United States Patent
Agirman et al.

(10) Patent No.: US 10,454,387 B2
(45) Date of Patent: Oct. 22, 2019

(54) INTERPOSITION INDUCTOR ARRANGEMENT FOR MULTIPLE DRIVES IN PARALLEL

(71) Applicant: Otis Elevator Company, Farmington, CT (US)

(72) Inventors: Ismail Agirman, Southington, CT (US); HanJong Kim, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/553,574

(22) PCT Filed: Feb. 12, 2016

(86) PCT No.: PCT/US2016/017679
§ 371 (c)(1),
(2) Date: Aug. 24, 2017

(87) PCT Pub. No.: WO2016/137759
PCT Pub. Date: Sep. 1, 2016

(65) Prior Publication Data
US 2018/0248494 A1    Aug. 30, 2018

Related U.S. Application Data

(60) Provisional application No. 62/120,750, filed on Feb. 25, 2015.

(51) Int. Cl.
*H02P 27/06*   (2006.01)
*H02M 7/493*   (2007.01)
*H02M 1/00*    (2006.01)

(52) U.S. Cl.
CPC .......... *H02M 7/493* (2013.01); *H02P 27/06* (2013.01); *H02M 1/00* (2013.01); *H02M 2001/0064* (2013.01)

(58) Field of Classification Search
CPC ......... H02M 7/49; H02M 7/493; H02M 7/043
(Continued)

(56) References Cited

U.S. PATENT DOCUMENTS 4,095,154 A   6/1978  Williamson
4,623,042 A   11/1986 Kamaike
(Continued)

FOREIGN PATENT DOCUMENTS

DE   102007063434 A1   1/2009
EP      2595291 A1    5/2013
(Continued)

OTHER PUBLICATIONS

Johnsy, A., Analysis of a Control Strategy for Parallel Operation of Single Phase Voltage Source Inverters, International Journal of Advanced Research in Electrical, Electronics and Instrumentation Engineering, V. 3, Special Issue 2, Apr. 2014.
(Continued)

*Primary Examiner* — Alex Torres-Rivera
(74) *Attorney, Agent, or Firm* — Cantor Colburn LLP

(57) ABSTRACT

A power system including a first drive including a first drive output, a second drive including a second drive output, wherein the first drive output is larger than the first drive output, at least one inductor operably coupled to the first drive and the second drive, and a load operably coupled to the system output.

12 Claims, 4 Drawing Sheets

(58) Field of Classification Search
USPC .................................. 323/247, 328; 363/71
See application file for complete search history.

(56) References Cited

U.S. PATENT DOCUMENTS

| | | | |
|---|---|---|---|
| 4,802,079 | A | 1/1989 | Mizoguchi |
| 5,460,244 | A | 10/1995 | Tanahashi |
| 6,037,686 | A * | 3/2000 | Schonauer ............ H01F 37/00 310/68 R |
| 6,495,940 | B2 | 12/2002 | Kliman et al. |
| 6,771,522 | B2 | 8/2004 | Hayashi et al. |
| 6,940,236 | B2 | 9/2005 | Horng et al. |
| 8,487,568 | B2 | 7/2013 | Franke |
| 8,760,105 | B2 | 6/2014 | Hsu |
| 8,853,974 | B2 | 10/2014 | Devos et al. |
| 9,281,776 | B2 * | 3/2016 | Nojiri ............... H02M 7/53873 |
| 2007/0024231 | A1 * | 2/2007 | Lee ..................... H02P 1/04 318/802 |
| 2008/0012626 | A1 * | 1/2008 | Kimura ................ H02M 3/158 327/531 |
| 2008/0197962 | A1 * | 8/2008 | Steenkamp ............ H02M 7/49 336/170 |
| 2012/0249045 | A1 * | 10/2012 | Kim ..................... H02P 27/06 318/768 |
| 2013/0070504 | A1 * | 3/2013 | Xu ..................... H02M 7/5388 363/132 |
| 2014/0300433 | A1 * | 10/2014 | Shudarek ............. H02M 1/126 333/177 |
| 2014/0354244 | A1 * | 12/2014 | Wagoner ................ H02P 9/007 322/91 |
| 2015/0138855 | A1 * | 5/2015 | Park ....................... H02M 7/42 363/71 |
| 2015/0308412 | A1 * | 10/2015 | Zagrodnik ............ H02M 7/003 290/44 |
| 2015/0349662 | A1 * | 12/2015 | Jiang .................. H02M 7/5395 363/71 |

FOREIGN PATENT DOCUMENTS

| | | |
|---|---|---|
| GB | 652188 | 4/1951 |
| JP | 2009035393 A | 2/2009 |
| KR | 101058867 | 8/2011 |
| SU | 1185529 | 10/1985 |
| WO | 2009/132427 A1 | 11/2009 |
| WO | 2014/001116 A1 | 1/2014 |

OTHER PUBLICATIONS

Shi, Bin and Venkataramanan, Girl, Parallel Operation of Voltage Source Inverters with Minimal Intermodule Reactors, IEEE, 2004.

European Patent Office, International Search Report, dated Jun. 21, 2016.

European Patent Office, Written Opinion of the International Searching Authority, dated Jun. 21, 2016.

Cho et al., "Parallel operation of PWM inverters for high speed motor drive system", IEEE, 2010, pp. 1561-1567.

Zhang, et al., "Total Flux Minimization Control for Integrated Inter-Phase Inductors in Paralleled, Interleaved Three-Phase Two-Level Voltage-Source Converters With Discontinuous Space-Vector Modulation", IEEE Transactions on Power Electronics, vol. 27, No. 4, Apr. 2012, pp. 1679-1688.

* cited by examiner

INTERPOSITION INDUCTOR ARRANGEMENT FOR MULTIPLE DRIVES IN PARALLEL

CROSS REFERENCE TO RELATED APPLICATIONS

The present application is a U.S. national stage of, and claims the priority benefit of, International Patent Application Serial No. PCT/US2016/017679, filed Feb. 12, 2016 and also claims the priority benefit of U.S. Provisional Patent Application Ser. No. 62/120,750 filed Feb. 25, 2015, the contents of which are hereby incorporated in their entirety into the present disclosure.

TECHNICAL FIELD OF THE DISCLOSED EMBODIMENTS

The presently disclosed embodiments generally relate to power systems, and more particularly, to an interposition inductor arrangement for multiple drives in parallel drive.

BACKGROUND OF THE DISCLOSED EMBODIMENTS

Modern power applications require a variety of power and current profiles. A motor that operates an elevator is one example. Modern elevator motors usually consist of three-phase motors. These motors often require varying power and current profiles in order to support the heavy duty applications of elevators. The electric drives that deliver power to these motors need to be able to support the power and current requirements.

When a three-phase motor, such as an elevator motor for example, needs a large duty drive, one option is to use two or more smaller drives in parallel to support the duty. The present invention relates to placing two or more drives, of varying power and current profiles, in parallel.

When placing two or more drive in parallel, circulating currents can affect the efficiency of the drive and make for an unequal sharing of current. Additionally, placing two or more drives in parallel may result in a reduction of voltage thereby limiting the operable range of a load device. For example, the motor will have a limited speed range when connected to such a parallel drive.

Therefore, there is a need for a system for placing in two or more drives in parallel that can limit circulating currents between drives, makes current sharing equal between drives, and does not reduce voltage at the system output.

SUMMARY OF THE DISCLOSED EMBODIMENTS

In one aspect, a power system is provided. The power system includes a first drive including a first drive output, a second drive including a second drive output, wherein the first drive output is larger than the second drive output. The power system further includes at least one inductor including a first inductor input, a second inductor input, and an inductor output, wherein the first drive output is operably coupled to the first inductor input, and the second drive output is operably coupled to the second inductor input. The power system further includes a load operably coupled to the inductor output. In one embodiment, the first drive and the second drive comprises a three phase power drive.

In one embodiment, the at least one inductor comprises at least one conductor wound around at least one magnetic core formed from a magnetic material. The at least one conductor is in electrical communication with the first inductor input, second inductor input, and inductor output. In another embodiment, the at least one inductor includes a first single-phase inductor, a second single phase inductor, and a third single phase inductor.

In an embodiment, the first drive first phase connection is operably coupled to the first inductor input of the first single-phase inductor, and the second drive first phase connection is operably coupled to the second inductor input of the first single-phase inductor. The first drive second phase connection is operably coupled to the first inductor input of the second single-phase inductor, and the second drive second phase connection is operably coupled to the second inductor input of the second single-phase inductor. The first drive third phase connection is operably coupled to the first inductor input of the third single-phase inductor, and the second drive third phase connection is operably coupled to the second inductor input of the third single-phase inductor.

In another embodiment, the at least one inductor includes a unitary inductor core including a first limb, a second limb, and a third limb. In an embodiment shown, a first conductor operably couples the first drive first phase connection to a first phase inductor output. A second conductor operably couples the second drive first phase connection to the first phase inductor output. A third conductor operably couples the first drive second phase connection to a second phase inductor output. A fourth conductor operably couples the second drive second phase connection to the second phase inductor output. A fifth conductor operably couples the first drive third phase connection to a third phase inductor output. A sixth conductor operably couples the second drive third phase connection to the second phase inductor output.

In another embodiment, the system includes a first drive including a first drive output and at least one first drive connection, a second drive including a second drive output and at least one second drive connection, and a third drive including third drive output and at least one third drive connection, wherein the first drive output, second drive output, and third drive output are equal. The first drive and the second drive are operably coupled to at least one first inductor, including at least one first inductor output. The at least one first inductor output and the third drive are operably coupled to at least one second inductor; including at least one second inductor output. The at least one second inductor output is operably coupled to a load.

In another embodiment, the system includes a first drive including a first drive output and at least one first drive connection, a second drive including a second drive output and at least one second drive connection, a third drive including a third drive output and at least one third drive connection, and a fourth drive including a fourth drive output and at least one fourth drive connection, wherein the first drive output, second drive output, third drive output, and fourth drive output are equal.

The first drive and second drive are operably coupled to at least one first inductor. The third drive and fourth drive are operably coupled to at least one second inductor. The at least one first inductor output and the at least one second inductor output are operably coupled to at least one third inductor. The at least one third inductor output is operably coupled to a load.

DETAILED DESCRIPTION OF THE DISCLOSED EMBODIMENTS

Figure 1:
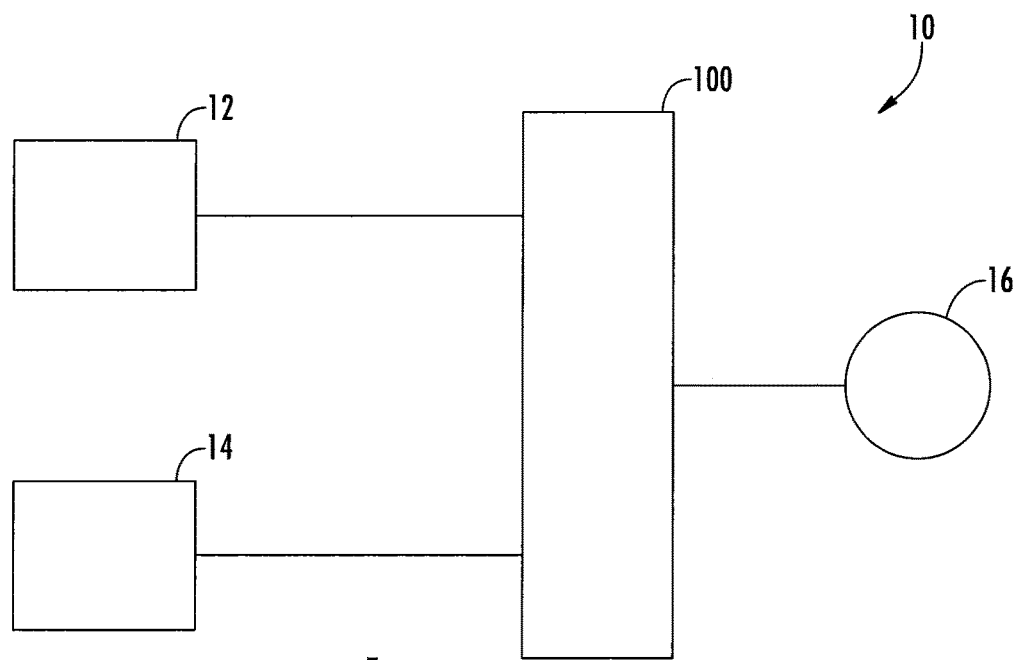
FIG. 1 illustrates a schematic drawing of a power system according to one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a power system, generally indicated at 10. The power system 10 includes a first drive 12 including a first drive output, a second drive 14 including a second drive output, wherein the first drive output is larger than the second drive output. The power system 10 further includes at least one inductor 100 including a first inductor input, a second inductor input, and an inductor output, wherein the first drive output is operably coupled to the first inductor input, and the second drive output is operably coupled to the second inductor input. The power system 10 further includes a load 16 operably coupled to the inductor output.

Figure 2:
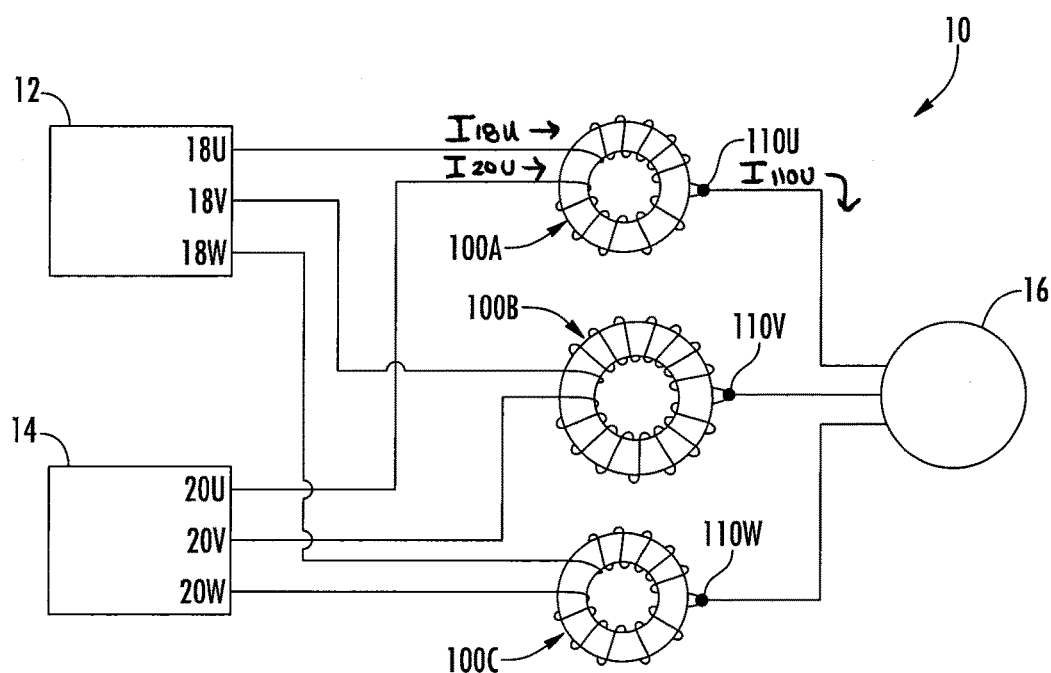
FIG. 2 illustrates a schematic drawing of a three phase power system according to one embodiment of the present disclosure.

In one embodiment, as shown in FIG. 2, the first drive 12 comprises a three phase power drive including a first drive first phase connection 18U, a first drive second phase connection 18V and a first drive third phase connection 18W. The second drive 14 comprises a three phase power drive including a second drive first phase connection 20U, a second drive second phase connection 20V, and a second drive third phase connection 20W.

In one embodiment, the at least one inductor 100 comprises at least one conductor wound around at least one magnetic core formed from a magnetic material, such as powdered iron, or ferrite, to name a few non-limiting examples. The at least one conductor is in electrical communication with the first inductor input, second inductor input, and inductor output. In one embodiment, as shown in FIG. 2, the at least one inductor 100 includes a first single-phase inductor 100A, a second single phase inductor 100B, and a third single phase inductor 100C. In the embodiment shown, the first drive first phase connection 18U is operably coupled to the first inductor input of the first single-phase inductor 100A, and the second drive first phase connection 20U is operably coupled to the second inductor input of the first single-phase inductor 100A. The first drive second phase connection 18V is operably coupled to the first inductor input of the second single-phase inductor 100B, and the second drive second phase connection 20V is operably coupled to the second inductor input of the second single-phase inductor 100B. The first drive third phase connection 18W is operably coupled to the first inductor input of the third single-phase inductor 100C, and the second drive third phase connection 20W is operably coupled to the second inductor input of the third single-phase inductor 100C.

For example, the first drive first phase connection 18U is operably coupled to the first inductor input of the first single-phase inductor 100A. A first conductor, operably coupled to the first inductor input, includes a number of turns around the magnetic core of the first single-phase inductor 100A such that there are N1 turns between the first drive first phase connection 18U and the inductor output 110U. A second conductor, operably coupled to the second inductor input, includes a number of turns around the magnetic core of the first single-phase inductor 100A such that there are N2 turns between the second drive first phase connection 20U and the inductor output 110U. The ratio of the number of turns N1 and N2 (N1:N2) depends upon the currents produced at the first inductor input by the first drive first phase connection 18U and at the second inductor input by the second drive first phase connection 20U, as well as the desired current at the inductor output 110U, and are defined as follows:

$$N_1 = I_{18U}/I_{110U} \times I_{20U}/I_{18U}$$

$$N_2 = I_{20U}/I_{110U} \times I_{18U}/I_{20U}$$

Where $I_{110U}$ is the first phase inductor output 110U current, $I_{18U}$ is the first drive first phase connection 18U current, and $I_{20U}$ is the second drive first phase connection 20U current.

For example, if $I_{110U}$, the first phase output 110U current, is 25 Amps, and $I_{18U}$, the first drive first phase connection 18U current, is 20 Amps, and $I_{20U}$, the second drive first phase connection 20U current, is 10 Amps, then $N_1$ and N2 are calculated as follows:

$$N_1 = 20 \text{ Amps}/25 \text{ Amps} \times 10 \text{ Amps}/20 \text{ Amps} = 0.4.$$

$$N_2 = 10 \text{ Amps}/25 \text{ Amps} \times 20 \text{ Amps}/10 \text{ Amps} = 0.8.$$

After normalizing $N_1$ and $N_2$, $N_1:N_2=2:1$. Therefore, $N_2$ would have twice as many turns as $N_1$ in order to produce the first phase output 110U current of 25 Amps.

The currents that flow from the first drive first phase connection 18U and the second drive first phase connection 20U generate a magnetic force in opposition to each other in the first single-phase inductor 100A. As such, since the first drive 12 is larger, it generally would cancel out the current of the second drive 14. As the respective currents enter the first single-phase inductor 100A, the first single-phase inductor 100A imposes a high impedance on the difference between the mode currents from the first drive first phase connection 18U and the second drive first phase connection 20U. The result is that the voltage at the first phase inductor output 110U is the average of the voltages of first drive first phase connection 18U and the second drive first phase connection 20U. Moreover, the first drive 12 and the second drive 14 may slightly modify the pulse width modulation commands such that a voltage difference across each drive phase to drive phase inductance may be created and actively control the current to the desired reference levels.

It will be appreciated that at least one conductor operates to couple the first drive second phase connection 18V and to the second drive second phase connection 20V to the second single phase inductor output 110V, and at least one conductor operates to couple the first drive third phase connection 18W and to the second drive third phase connection 20W to the third single phase inductor output in a similar manner.

Figure 3:
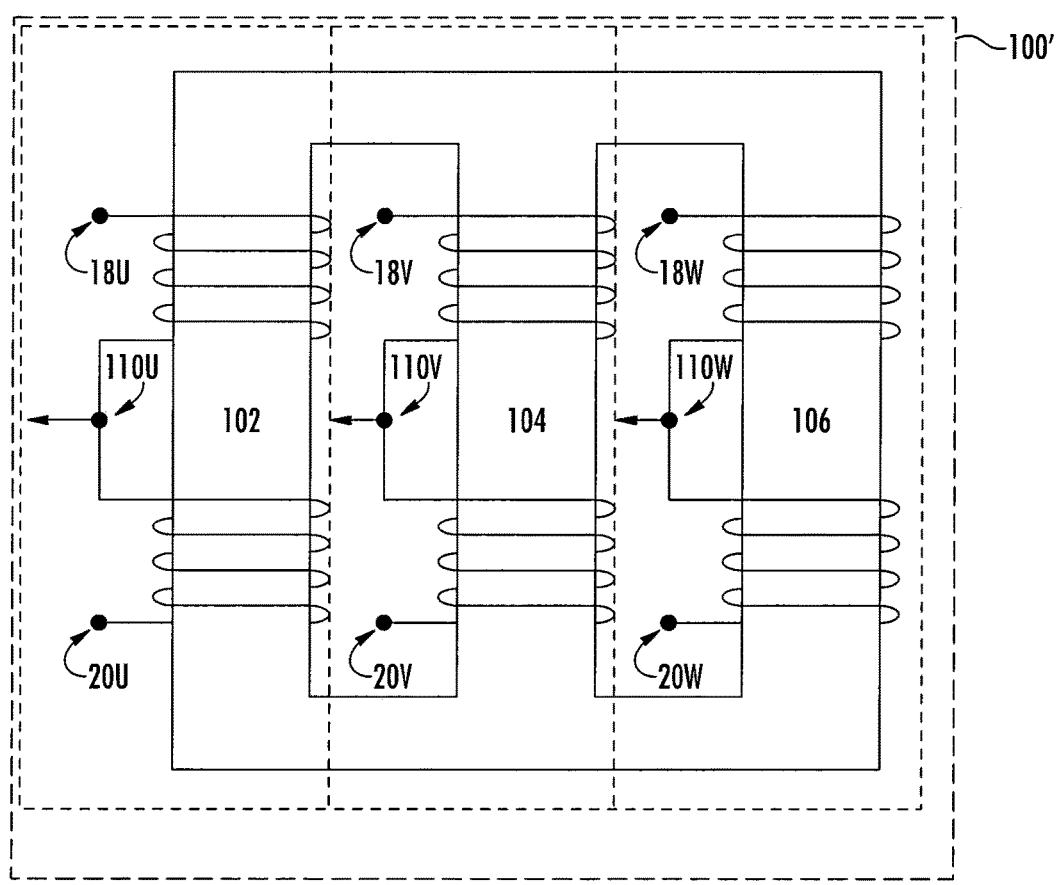
FIG. 3 illustrates a schematic drawing of a three phase power system according to another embodiment of the present disclosure.

In another embodiment, as shown in FIG. 3, the at least one inductor 100' includes a unitary inductor core including a first limb 102, a second limb 104, and a third limb 106. In the embodiment shown, a first conductor operably couples the first drive first phase connection 18U to a first phase inductor output 110U. A second conductor operably couples the second drive first phase connection 20U to the first phase inductor output 110U. A third conductor operably couples the first drive second phase connection 18V to a second phase inductor output 110V. A fourth conductor operably couples the second drive second phase connection 20V to the second phase inductor output 110V. A fifth conductor operably couples the first drive third phase connection 18W to a third phase inductor output 110W. A sixth conductor operably couples the second drive third phase connection 20W to the second phase inductor output 110W.

The inductor output 110U is coupled to the first conductor such that there are N1 turns between the first drive first phase connection 18U and the inductor output 110U. The inductor output 110U is further coupled to the second conductor such that there are N2 turns between the second drive first phase connection 20U and the inductor output 110U. It will be appreciated that the number of turns N1 and N2 may be defined by the formulas disclosed above. The number of turns for the conductors wrapped around the second limb 104 and the third limb 106 may be similarly determined. The first phase inductor output 110U, second phase inductor output 110V, and the third phase inductor output 110W may then be connected to the load 16.

Figure 4:
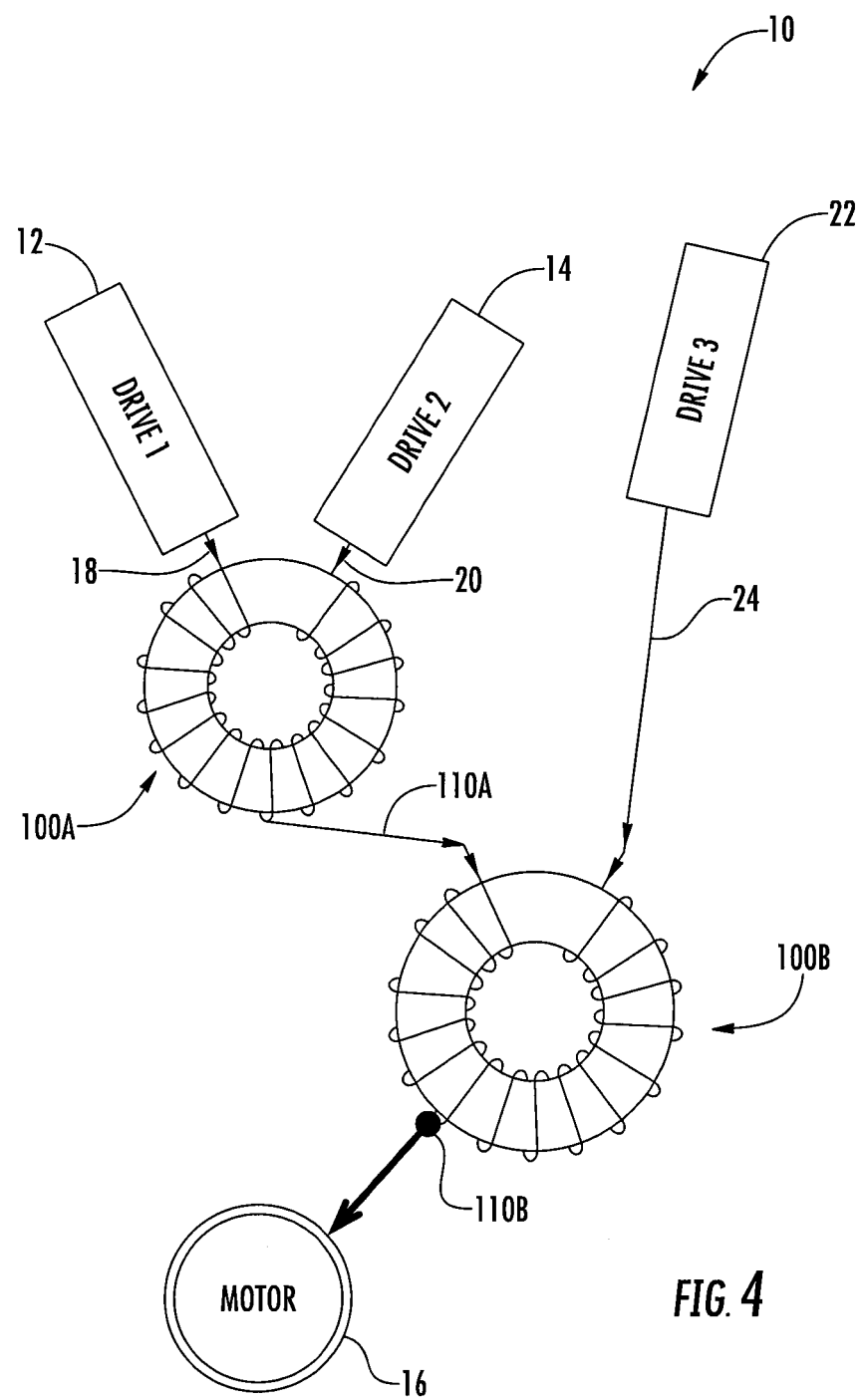
FIG. 4 illustrates a schematic drawing of a power system utilizing an odd number of drives according to one embodiment of the present disclosure.

In another embodiment, as shown in FIG. 4, the system 10 includes a first drive 12 including a first drive output and at least one first drive connection 18, a second drive 14 including a second drive output and at least one second drive connection 20, and a third drive 22 including third drive output and at least one third drive connection 24, wherein the first drive output, second drive output, and third drive output are equal. The first drive 12 and the second drive 14 are operably coupled to at least one first inductor 100A, including at least one first inductor output 110A. The first drive 12 and the second drive 14 are operably coupled to the at least one inductor 100A in a similar manner as described herein. The at least one first inductor output 110A and the third drive 22 are operably coupled to at least one second inductor 100B; including at least one second inductor output 110B in a similar manner as described herein. The at least one second inductor output 110B is operably coupled to a load 16.

For example, the at least one first drive connection 18 is coupled to a first inductor input of the at least one first inductor 100A. The first inductor input is operably coupled to a first conductor wrapped around the magnetic core of the at least one first inductor 100A. The at least one second drive connection 20 is coupled to a second inductor input of the at least one first inductor 100A. The second inductor input is operably coupled to a second conductor wrapped around the magnetic core of the at least one first inductor 100A. The first conductor includes a number of turns, N1, around the magnetic core of the at least one inductor 100A between the first inductor input and the at least one first inductor output 110A. The second conductor includes a number of turns, N2, around the magnetic core of the at least one inductor 100A between the second inductor input and the at least one first inductor output 110A. The ratio of the number of turns N1 and N2 (N1:N2) is (1:1) as the first drive output and the second drive output are equal The at least one first inductor output 110A is coupled to a first inductor input of the at least one second inductor 100B. The first inductor input 110A is operably coupled to a first conductor wrapped around the magnetic core of the at least one second inductor 100B. The at least one third drive connection 24 is operably coupled to a second inductor input of the at least one second inductor 100B. The second inductor input is operably coupled to a second conductor wrapped around the magnetic core of the at least one second inductor 100B. The first conductor includes a number of turns, N3, around the magnetic core of the at least one inductor 100B between the first inductor input and the at least one second inductor output 110B. The second conductor includes a number of turns, N4, around the magnetic core of the at least one inductor 100B between the second inductor input and the at least one second inductor output 110B. The ratio of the number of turns N3 and N4 (N3:N4) is (1:2). It will be appreciated that each phase of the drives 12, 14, and 22 are connected in the same manner as described herein. It will also be appreciated that the embodiments as shown in FIG. 4 may be used for any configuration containing an odd number of drives.

Figure 5:
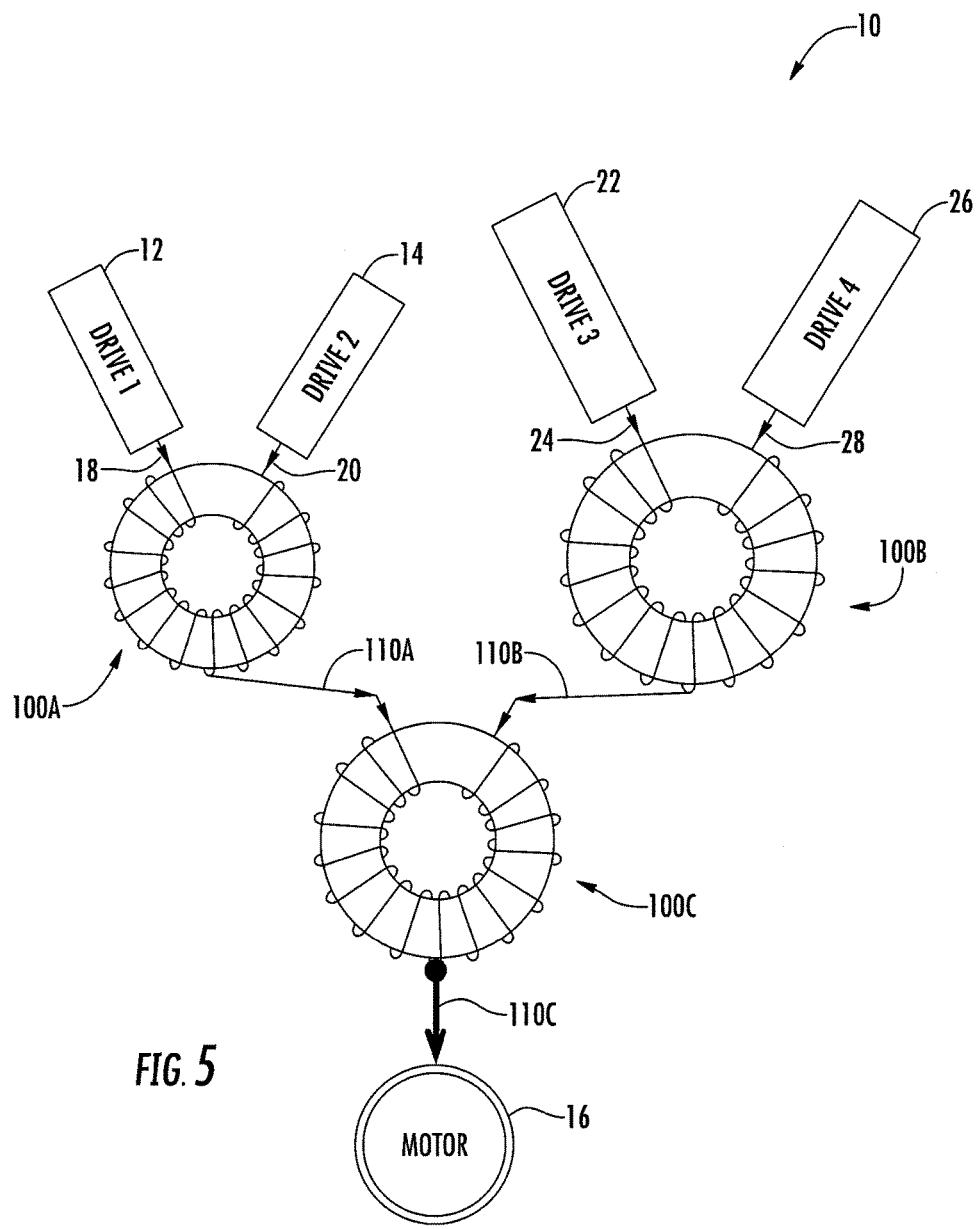
FIG. 5 illustrates a schematic drawing of a power system utilizing an even number of drives according to one embodiment of the present disclosure.

In another embodiment, as shown in FIG. 5, the system 10 includes a first drive 12 including a first drive output and at least one first drive connection 18, a second drive 14 including a second drive output and at least one second drive connection 20, a third drive 22 including a third drive output and at least one third drive connection 24, and a fourth drive 26 including a fourth drive output and at least one fourth drive connection 24, wherein the first drive output, second drive output, third drive output, and fourth drive output are equal.

The first drive 12 and second drive 14 are operably coupled to at least one first inductor 100A. The third drive 22 and fourth drive 14 are operably coupled to at least one second inductor 100B. The at least one first inductor output 110A and the at least one second inductor output 110B are operably coupled to at least one third inductor 100C. The at least one third inductor output 110C is operably coupled to a load 16.

For example, the at least one first drive connection 18 is coupled to a first inductor input of the at least one first inductor 100A. The first inductor input is operably coupled to a first conductor wrapped around the magnetic core of the at least one first inductor 100A. The at least one second drive connection 20 is coupled to a second inductor input of the at least one first inductor 100A. The second inductor input is operably coupled to a second conductor wrapped around the magnetic core of the at least one first inductor 100A. The first conductor includes a number of turns, N1, around the magnetic core of the at least one first inductor 100A between the first inductor input and the at least one first inductor output 110A. The second conductor includes a number of turns, N2, around the magnetic core of the at least one first inductor 100A between the second inductor input and the at least one first inductor output 110A. The ratio of the number of turns N1 and N2 (N1:N2) is (1:1) as the first drive output and the second drive output are equal.

The at least one third drive connection 24 is coupled to a first inductor input of the at least one second inductor 100B. The first inductor input is operably coupled to a first conductor wrapped around the magnetic core of the at least one second inductor 100B. The at least one fourth drive connection 28 is coupled to a second inductor input of the at least one second inductor 100B. The second inductor input is operably coupled to a second conductor wrapped around the magnetic core of the at least one second inductor 100B. The first conductor includes a number of turns, N3, around the magnetic core of the at least one second inductor 100B between the first inductor input and the at least one second inductor output 110B. The second conductor includes a number of turns, N4, around the magnetic core of the at least one second inductor 100B between the second inductor input and the at least one second inductor output 110B. The ratio of the number of turns N3 and N4 (N3:N4) is (1:1) as the third drive output and the fourth drive output are equal.

The at least one first inductor output 110A is coupled to a first inductor input of the at least one third inductor 100C. The first inductor input is operably coupled to a first conductor wrapped around the magnetic core of the at least one third inductor 100C. The at least one second inductor output 110B is coupled to a second inductor input of the at least one third inductor 100C. The second inductor input is operably coupled to a second conductor wrapped around the magnetic core of the at least one third inductor 100C. The first conductor includes a number of turns, N5, around the magnetic core of the at least one third inductor 100C between the first inductor input and the at least one third inductor output 110C. The second conductor includes a number of turns, N6, around the magnetic core of the at least one third inductor 100C between the second inductor input and the at least one third inductor output 110C. The ratio of the number of turns N5 and N6 (N5:N6) is (1:1) as the third drive output and the fourth drive output are equal. It will also be appreciated that the embodiments as shown in FIG. 5 may be used for any configuration containing an even number of drives.

It will therefore be appreciated that power system 10 includes a first drive 12 and a second drive 14 operably coupled to the at least one inductor 100 in such an arrangement to limit the circulating currents, and improve current sharing between the first drive 12 and a second drive 14.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A motor system comprising:
a first drive including a first drive output;
a second drive including a second drive output, wherein the first drive output is larger than the second drive output;
at least one inductor having a magnetic core operably coupled to the first drive and the second drive to create a system output; and
a load operably coupled to the system output;
the first drive output coupled to the at least one inductor by a first conductor including a first number of turns around the magnetic core;
the second drive output coupled to the at least one inductor by a second conductor including a second number of turns around the magnetic core;
wherein the first number of turns is not equal to the second number of turns;
wherein a ratio of the first number of turns to the second number of turns is dependent on a first current in the first conductor and a second current in the second conductor;
wherein the first drive comprises a multi-phase drive including at least a first drive first phase connection and a first drive second phase connection; and the second drive comprises a multi-phase drive including at least a second drive first phase connection and a second drive second phase connection.

2. The motor system of claim 1, wherein the at least one inductor comprises a magnetic core.

3. A motor system comprising:
a first drive including a first drive output;
a second drive including a second drive output, wherein the first drive output is larger than the second drive output;
at least one inductor having a magnetic core operably coupled to the first drive and the second drive to create a system output; and
a load operably coupled to the system output;
the first drive output coupled to the at least one inductor by a first conductor including a first number of turns around the magnetic core;
the second drive output coupled to the at least one inductor by a second conductor including a second number of turns around the magnetic core;
wherein the first number of turns is not equal to the second number of turns;
wherein a ratio of the first number of turns to the second number of turns is dependent on a first current in the first conductor and a second current in the second conductor;
wherein the first drive comprises a three phase drive including a first drive first phase connection, a first drive second phase connection and a first drive third phase connection; and
the second drive comprise a three phase drive including a second drive first phase connection, a second drive second phase connection and a second drive third phase connection.

4. The motor system of claim 3, wherein the at least one inductor comprises a first single-phase inductor, a second single phase inductor, and a third single phase inductor.

5. The motor system of claim 4, wherein
the first drive first phase connection and the second drive first phase connection are operably coupled to the first single-phase inductor to form a first phase output;
the first drive second phase connection and the second drive second phase connection are operably coupled to the second single phase inductor to form a second phase output; and
the first drive third phase connection and the second drive third phase connection are operably coupled to the third single phase inductor to form a third phase output.

6. The motor system of claim 5, further comprising a load operably coupled to the first phase output, the second phase output, and the third phase output.

7. The motor system of claim 4, wherein the at least one inductor comprises a unitary inductor including a first limb, a second limb, and a third limb.

8. The motor system of claim 7, wherein
the first drive first phase connection and the second drive first phase connection are operably coupled to the first limb to form a first phase output;
the first drive second phase connection and the second drive second phase connection are operably coupled to the second limb to form a second phase output; and
the first drive third phase connection and the second drive third phase connection are operably coupled to the third limb to form a third phase output.

9. The motor system of claim 8, further comprising a load operably coupled to the first phase output, the second phase output, and the third phase output.

10. A motor system comprising:
at least three drives including at least one drive connection;
at least two inductors operably coupled to the at least three drives to create at least one system output; and
a load operably coupled to the at least one system output;
wherein a maximum of two drives are operably coupled to a single at least one inductor;

wherein a quantity of the at least two inductors is equivalent to the number of drives minus one;
wherein a first drive of the at least three drives comprises a multi-phase drive including at least a first drive first phase connection and a first drive second phase connection; and a second drive of the at least three drives comprises a multi-phase drive including at least a second drive first phase connection and a second drive second phase connection.

11. The motor system of claim 10, wherein the at least one inductor comprises a magnetic core.

12. The motor system of claim 10, wherein each of the at least three drives comprises a three-phase drive.

* * * * *